No Printed Specification Available
672X
J. S. Mott,
Wood Planing Machine.
Patented Mar. 8, 1806.
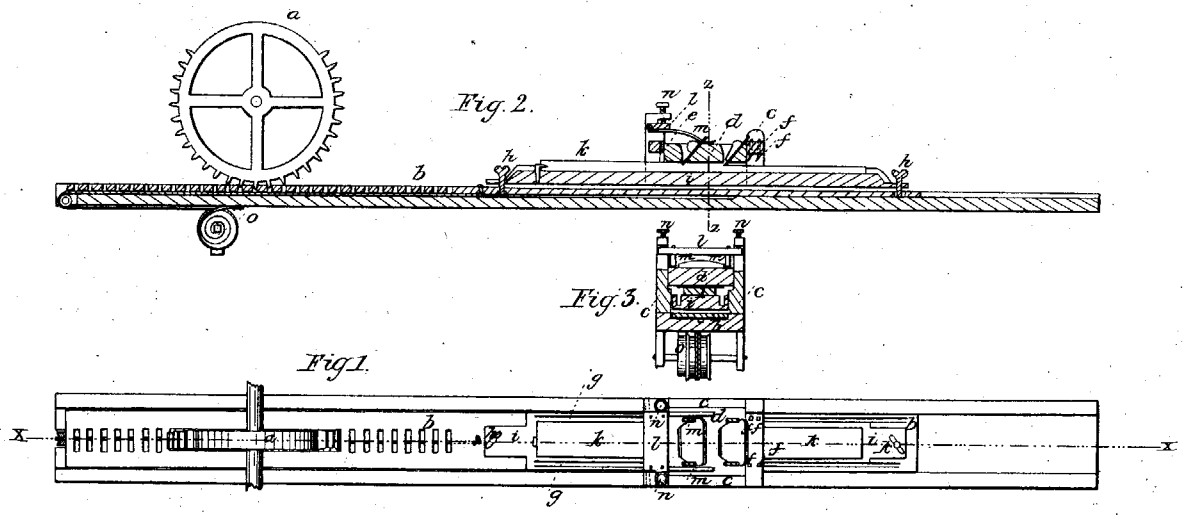
AM. PHOTO-LITHO. CO. N.Y. (OSBORNE'S PROCESS)

672X

Joseph L. Mott
[illegible] Patent

The schedule [illegible] the [illegible] patent & making part of the same containing a description in the words of the said Joseph L. Mott himself of his Joining and planing machine This machine consists of the following parts
1st A spur wheel running in the work shop, the spurs or cogs of which operate on four or fewer carriages moving in grooves of a length admitting their passing each other or the spur wheel may run outside of the shop in the side of which an opening being made the cogs may work the carriage within 2nd Above each carriage is fixed a Rack containing any number of planes placed in the rabitted Bars which form the Racks each rank of planes being placed the thickness of a shaving lower than the one before and in such a manner that the succeeding rank of planes shall cover and take off the [illegible] shaving left by the Interstices between each of the planes of the preceding ranks. The planes are let in rabitted crossbars having a shoulder [illegible] on the face which is thus sunk even with or below the bars before each plane are sweepers to carry off sand & dirt, which might injure the planes. The front of each plane should be bevelled off at the front edge in order to raise it on the board.
At the end of each rack there should be slitting gauges.

The carriage has deep grooves or gutters in which the boards are dropped to admit the edge being planed jointed or grooved. At the ends of the carriages are placed troughs into which the shavings fall & are carried [illegible]
[illegible]

6727

[illegible]

[illegible] the carriage.
The [illegible] raised or depressed by
means of [illegible] and the edge of the board
raised as much as it is to be planed down to a gage.
3rd A Beam above the rack supports the arm on spring
pressing against the plane by screwing the wing button
against the beam the pressure of the spring against the
plane may be increased [illegible] thus
accommodating them to the thickness of the shaving re
quired.
There should be a spring to hold the carriage back to
the spur wheel
Witnesses
Zach [illegible]
Horace [illegible]

Joseph [illegible]

(Patented March 8. 1806)
Received & Recorded anew (November 2. 1839 [illegible]
from the original Patent.—

1180 [illegible]

Drawing in Portfolio

E. H. M. N.